(12) United States Patent
Tran et al.

(10) Patent No.: US 11,727,442 B2
(45) Date of Patent: *Aug. 15, 2023

(54) METHOD FOR SERVING INTERACTIVE CONTENT TO A USER

(71) Applicant: Yieldmo, Inc., New York, NY (US)

(72) Inventors: Jean Tran, New York, NY (US); Bo Wang, New York, NY (US); David Goligorsky, New York, NY (US); David Sebag, New York, NY (US)

(73) Assignee: Yieldmo, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,532

(22) Filed: Jun. 30, 2021

(65) Prior Publication Data
US 2021/0326930 A1    Oct. 21, 2021

Related U.S. Application Data

(63) Continuation-in-part of application No. 17/325,074, filed on May 19, 2021, now Pat. No. 11,538,066, which is a continuation of application No. 15/677,259, filed on Aug. 15, 2017, now Pat. No. 11,042,906.

(60) Provisional application No. 63/194,406, filed on May 28, 2021, provisional application No. 62/375,228, filed on Aug. 15, 2016.

(51) Int. Cl.
*G06Q 30/02*      (2023.01)
*G06F 3/0485*    (2022.01)
*G06F 3/04883*  (2022.01)
*G06Q 30/0251*  (2023.01)

(52) U.S. Cl.
CPC ....... *G06Q 30/0267* (2013.01); *G06F 3/0485* (2013.01); *G06F 3/04883* (2013.01)

(58) Field of Classification Search
CPC .. G06Q 30/0207–0277; G06Q 30/0267; G06F 3/0485; G06F 3/04883; G06F 3/0488
See application file for complete search history.

(56) References Cited

U.S. PATENT DOCUMENTS

2015/0309687 A1* 10/2015 Herigstad ............ H04N 21/478
                                                                        715/784

* cited by examiner

*Primary Examiner* — Chinyere Mpamugo
(74) *Attorney, Agent, or Firm* — Run8 Patent Group, LLC; Peter Miller; Leah Raddatz

(57) ABSTRACT

A variation of a method for serving interactive content includes: inserting a parent card into a visual element; inserting a set of child cards over the parent card in the visual element, each child card including advertising content related to the parent card; in response to a swipe over the visual element following insertion of the visual element into a document rendered on a display, indexing through the set of child cards rendered over the parent card; in response to selection of a child card, triggering the computing device to open an expanded window over the document; rendering expanded variants of child cards within the expanded window; in response to a swipe over the expanded window, indexing through expanded variants of the set of child cards rendered; and, in response to selection of an expanded variant of a particular child card, triggering the computing device to navigate to an external document associated with the particular child card.

20 Claims, 5 Drawing Sheets

METHOD FOR SERVING INTERACTIVE CONTENT TO A USER

CROSS-REFERENCE TO RELATED APPLICATIONS

This Application claims the benefit of U.S. Provisional Application No. 63/194,406, filed on 28 May 2021, which is incorporated in its entirety by this reference.

This Application is a continuation-in-part application of U.S. patent application Ser. No. 17/325,074, filed on 19 May 2021, which is a continuation application of U.S. patent application Ser. No. 15/677,259, filed on 15 Aug. 2017, which claims the benefit of U.S. Provisional Application No. 62/375,228, filed on 15 Aug. 2016, each of which is incorporated in its entirety by this reference.

The Application is related to U.S. patent application Ser. No. 15/217,879, filed on 22 Jul. 2016, which is incorporated in its entirety by this reference.

TECHNICAL FIELD

This invention relates generally to the field of mobile advertising and more specifically to new and useful methods for serving interactive content to a user in the field of mobile advertising.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHOD

Figure 1:
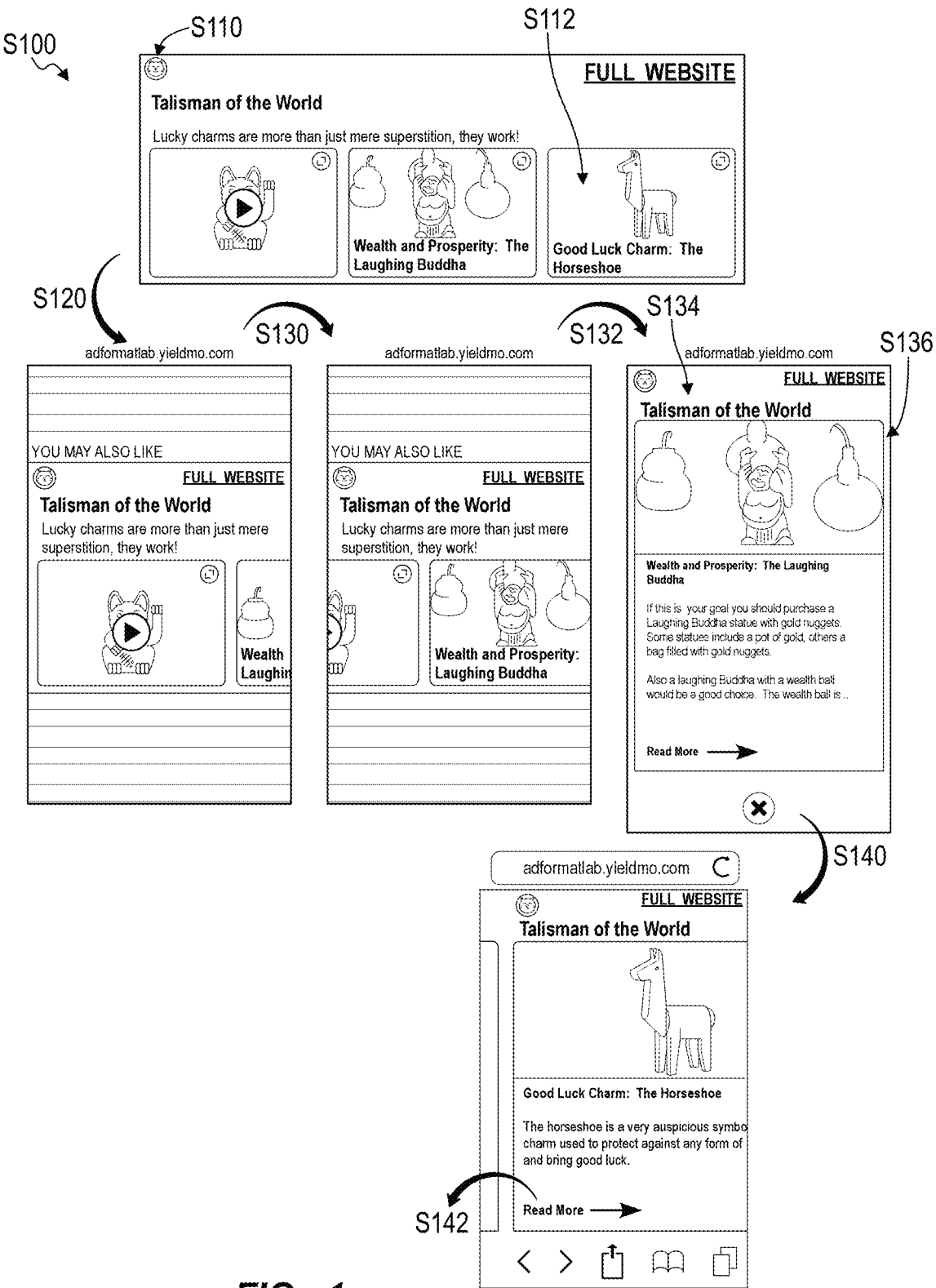
FIG. 1 is a flowchart representation of a method.

As shown in FIG. 1, a method S100 for serving interactive content to a user includes: inserting a parent card, including advertising content, into a visual element in Block S110; inserting a set of child cards over the parent card in the visual element, each child card, in the set of child cards, including a hero image, advertising content related to the parent card, and a link to a related external document in Block S120; in response to a swipe input over the visual element following insertion of the visual element into a document rendered on a display of a computing device, indexing through the set of child cards rendered over the parent card within the visual element in Block S130; in response to selection of a child card, in the set of child cards, within the visual element, triggering the computing device to open an expanded window over the document in Block S132; rendering expanded variants of child cards in the set of child cards within the expanded window in Block S134; in response to a swipe input over the expanded window, indexing through expanded variants of the set of child cards rendered within the expanded window in Block S140; and in response to selection of an expanded variant of a particular child card within the expanded window, triggering the computing device to navigate to an external document associated with the particular child card based on a link associated with the particular child card in Block S142.

2. APPLICATIONS

Generally, the method S100 can be executed by an advertising (or "ad") platform to serve serialized, hierarchical branded content to a user through a visual element embedded into a webpage accessed through a web browser or embedded into a native application executing on a smartphone, tablet, smart watch, laptop computer, desktop computer, or other computing device. In particular, the method S100 can be executed by an ad platform (and/or an ad tech vendor, a publisher, an ad agency, or an online social networking platform, etc.) to: generate a visual element containing multiple content streams or aspects of a brand, a product supplied by the brand, or a service provided by the brand, etc.; to insert the visual element in-line with content in a webpage or document within a native application at a user's computing device; and to advance through a tiered hierarchy of information density for each content stream or aspect as the user engages further with content in the visual element.

Blocks of the method S100 can be executed by an ad platform to incorporate serialized and/or multi-faceted editorial content into a single visual element—representing this content in multiple levels of abstraction—that, when embedded into a webpage or native application, advances through a sequence of visual elements, expanded windows, and external webpages to serve this content to a user in lower levels of abstraction as the user's engagement with the content increases. For example, the ad platform can execute Blocks of the method S100 to: incorporate a title and global abstract from a microsite (described below) into a parent card within a visual element; to incorporate a hero image and a chapter heading from each section or webpage within the microsite into one corresponding child card; to incorporate an abstract, a secondary image, or other additional local content from a corresponding section or webpage within the microsite into the expanded variant of each child card; and to link the expanded variant of each corresponding child card to its corresponding webpage or section (e.g., via an anchor tag) within the microsite in Blocks S110 and S112.

In this example, the ad platform (and/or an ad tech vendor, a publisher, or an ad agency, etc.) can insert a visual element—containing the parent card wrapping the set of child cards—in-line with text and/or other media within another webpage accessed through a web browser executing on the user's smartphone (or other computing device) in Block S120. The visual element can show multiple child cards simultaneously, such as a first child card (in the ordered set of child cards) and a section of a second child card to the right of the first child card; if content in the visual element piques the user's interest and the user swipes over the visual element or taps on the expand icon, the visual element can scroll laterally through the child cards wrapped by the parent card in Block S130. If the user selects the parent card, such as by selecting the title within the parent card, the visual element can navigate to the home page or to the top of the associated microsite. Alternatively, if the user selects one of the child cards, the visual element can open an expanded window over the website, show the expanded variant of the selected child card within the expanded window—including additional textual or visual content—in Block S132, and scroll laterally through the expanded variants of the child cards within the expanded window if the user swipes laterally over the expanded window in Block S140. If the user then selects the expanded variant of a particular child card within the expanded window, the visual element can then navigate to a particular webpage or to a particular section of one webpage within the microsite corresponding to the selected child card in Block S142. Alternatively, the visual element can close the expanded window if the user selects a close button on the expanded window. To prompt the user to engage with content within the visual element, the visual element can also animate content within one or more child cards, such as based on speed and directions of scroll events occurring within a document containing the visual element.

The visual element can therefore: present a global theme or title (i.e., a "first tier") within a parent card to the user; present a local title or heading for each of multiple discrete content streams relating to the global theme or title within corresponding child cards (i.e., a "second tier") wrapped within the parent card; present expanded variants of each child card—including an abstract, description, or additional secondary image—(i.e., a "third tier") within an expanded window popping out from the visual element when the child card is selected by the user; and link to a particular webpage or section of a webpage (i.e., a "fourth tier") when an expanded variant of a corresponding child card is selected from the expanded window. In particular, by sequentially increasing access to content in different streams relating to the global theme, the visual element can enable a user viewing the visual element to quickly visually access the global theme (the first tier), engage with a particular sub-theme within the global theme (i.e., the "second tier"), access additional details related to a particular subtheme (i.e., the "third tier"), and then access complete, original content relating to the particular theme (i.e., the "fourth tier").

Similarly, in a variation of the method S100 described below, the visual element can: present to the user a global theme or hero image (i.e., "a first tier") including selection areas (or "hotspots") overlaid on particular areas of the parent card; in response to selection of a particular area, present a child card—overlaid on top of the parent card—detailing features and/or aspects of the particular area of the parent card with a greater degree of detail (i.e., a "second tier"); present expanded variants of each child card (i.e., "third tiers") within an expanded window popping out from the visual element when a child card is selected by the user; and/or link to a particular webpage or section of a webpage (i.e., a "fourth tier") when an expanded variant of a corresponding child card is selected from the expanded window. In particular, the visual element can enable a user interacting with the visual element to engage with a parent card, to view content associated with a tier of information directly proportional to her interest level in the content rendered in the visual element, and to cache content associated with tiers of information (e.g., the parent card, child cards, expanded variants, external documents) exceeding her interest level. Thus, the visual element can exclusively render information relevant to a user and avoid burdening the user with content that may not interest the user while also permitting the user to comfortably consume incrementally-denser information.

Furthermore, by supplying branded content to the user both through multiple streams and through multiple information density tiers, the visual element (and/or the ad platform, etc.) can also characterize the user's engagement with this branded content at an increased resolution. For example, the visual element can characterize the user's engagement with this content based on global interactions with the visual element and local interactions with the child cards and expanded variants of the child cards, such as whether the user scrolls through child cards within the visual element, selects a child card within the visual element, scrolls through expanded variants of child cards within the expanded window, selects an expanded variant of a child card within the expanded window, and/or views a video linked to an expanded variant of a child card selected by the user, etc. and generates an engagement metric for the user accordingly.

The method S100 is described herein as executed to generate a visual element containing a parent card and a set of child cards from textual and/or visual media extracted from, copied from, or based on content from a microsite (described below) and to serve these cards to a user through a webpage accessed within a web browser. However, the method S100 can be executed to compile or aggregate media from one or more existing sources or new content into a visual element and/or to serve this visual element to a user through any other pathway, such as by inserting the visual element into a document within a native application executing on a smartphone, smartwatch, tablet, or other computing device.

3. INTERACTIVE VISUAL AD GENERATION

Block S110 of the method S100 recites inserting a parent card into a visual element; and Block S112 recites inserting a set of child cards into the parent card, wherein each child card includes a hero image and a link to a related external document. Generally, in Blocks S110 and S112, the ad platform functions to generate a visual element that contains multiple streams of content—related to a common theme—in multiple discrete information density tiers.

In one implementation, the ad platform hosts an advertiser portal that can be accessed by an human representative of an advertiser to populate a generic interactive visual ad template with content: from an external microsite (e.g., a single webpage or cluster of highly-cohesive pages generated by or on behalf of a brand); from marketing cover; from brand cover; from an article; or from other textual and visual digital media containing multiple discrete subthemes, sections, chapters, episodes, members, or divisions, etc. unified under a common (i.e., global) theme. For example, an advertiser can access an instance of the advertiser portal through a native application or through a web browser executing on a desktop computer, a laptop computer, a smartphone, or a tablet and then enter a URL of a microsite; and the advertiser portal can automatically scrape a parent hero image, parent abstract, and parent title from the top of the microsite (or main page of the microsite), scrape a hero image, section title, and secondary media from each section (or discrete webpage) within the microsite, and populate the parent, child, and expanded variant child cards from these media. Alternatively, the advertiser can upload media (e.g., text, static images, videos, etc.) into the advertiser portal and manually populate template parent, child, and expanded variant child cards with these media to manually create the interactive visual ad. However, the ad platform can implement any other method or technique to access textual and visual media and to aggregate these media in multiple discrete streams of content—each containing content in multiple discrete information density tiers—affiliated with a common theme (i.e., multiple child cards unified under one parent card).

3.1 PARENT CARD

A parent card can define a container for child cards and a lowest information density tier. The parent card can include a parent hero image, such as a background color from the microsite, an image of a primary icon (e.g., a brand icon) from the microsite, or a first image contained at the top of the microsite. The parent card can also contain a title and/or a general abstract, such as a title and abstract extracted directly from the microsite or such as a title and a caption, a first sentence, the first ten words, or the first 50 characters following the title on the microsite. The parent card can further contain a link to external content, such as a link to the microsite with an anchor tag for the top of the microsite or a link to a homepage of the microsite.

The parent card can also include content related to the microsite (i.e., a website rendered within the visual element) distinct from the document into which the visual element is embedded as described below. For example, a third-party processor (e.g., an ad server) can embed the visual element inline in (e.g., between rows of text and images) a document, such as a news article rendered within a webpage; the visual element can render content, such as a mobile advertisement depicting an automobile, that may be pertinent to a user viewing the article but distinct from content of the article or webpage into which the visual element is embedded.

The parent card can span the width and/or height of the visual element to define a static background image or color over which child cards are inserted and can include a direct link to external content (e.g., to the external microsite).

3.2 CHILD CARDS

A child card corresponds to one content stream under the parent card and defines a second tier of information density for its corresponding content stream. In particular, a child card can define an abridged version of a webpage within the microsite and can include a section title and a hero image for one discrete subtheme, section, chapter, episode, member, or division, etc. within the global theme (e.g., the microsite) of the parent card. For example, a child card can include: a textual section heading from a particular section of the microsite or from a secondary webpage within the microsite; and a hero image including a first image from this section of the microsite or from this secondary webpage within the microsite. In another example, a child card can include an image and a body of text less than a particular character length (e.g., a short body of text extracted from a section of a webpage of the microsite).

Figure 2:
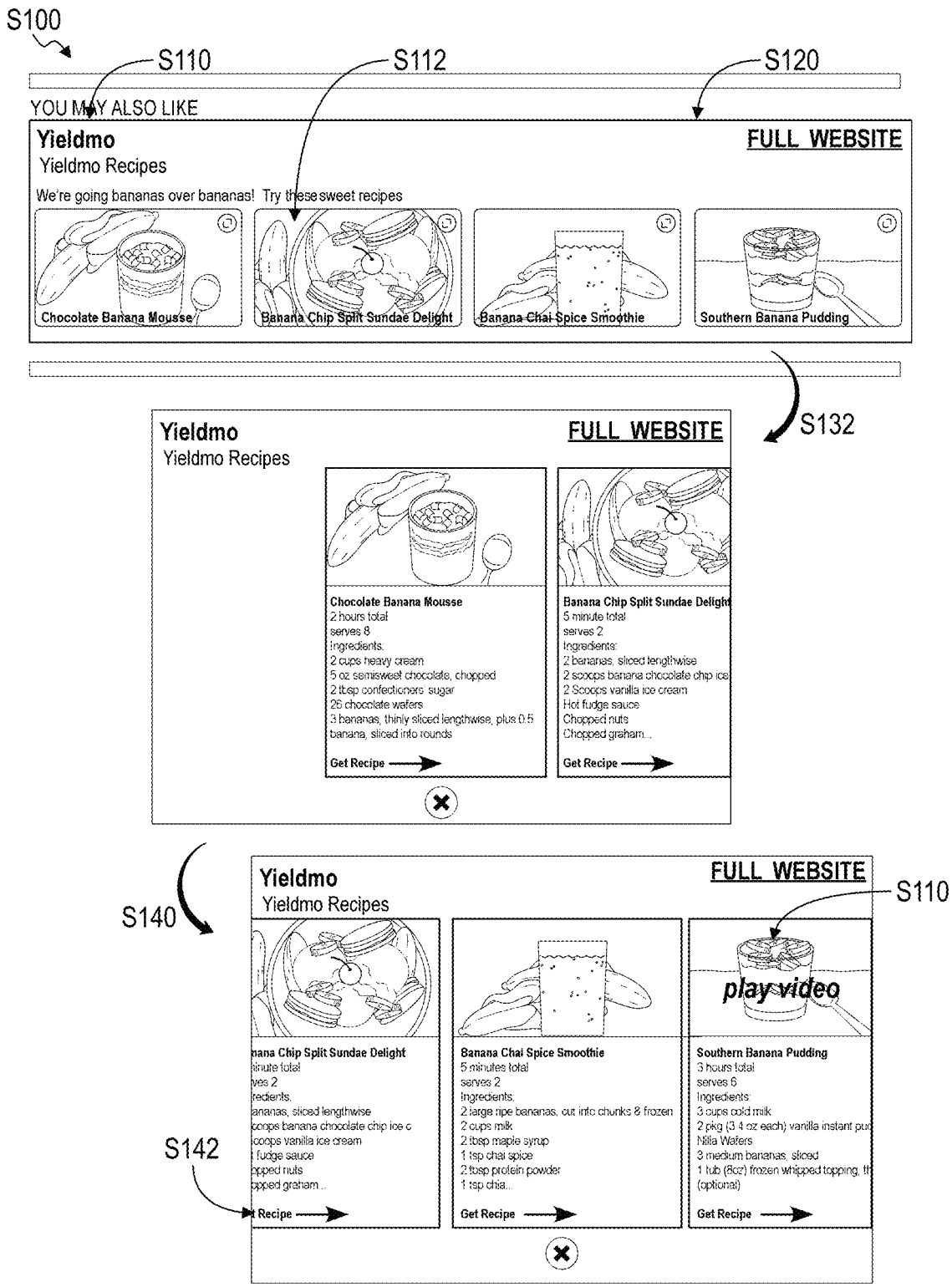
FIG. 2 is a flowchart representation of one variation of the method.

The ad platform can thus generate a set of (e.g., two or more) child cards per parent card and can insert each child card into one carousel position within a virtual horizontal card carousel—over or wrapped by the parent card—in the visual element, as shown in FIGS. 1 and 2. For example, for a set of child cards containing content extracted from an ordered sequence of subthemes, sections, chapters, episodes, members, or divisions, etc. within the microsite, the ad platform can insert these child cards in order into carousel positions within the virtual horizontal card carousel. In particular, the visual element can render each child card—including its hero image and section title—in one carousel position in Block S120 to form a single row of child cards that can be scrolled through laterally within the visual element in Block S130. The set of child cards can be ordered according to a contiguous narrative or storyline related to and portraying the parent card's global theme in a logical and sequential series.

As shown in FIG. 1, Block S130 of the method S100, recites indexing through the set of child cards in response to the swipe input between a first time and a second time. Generally, the visual element is configured to index or scroll through the set of child cards in response to an input, such as a swipe, nonparallel to a scroll axis of the window, and over the visual element.

The visual element can render the set of child cards such that the height of each child card, in the set of child cards, is less than the height of the visual element and less than the height of the parent card rendered in the visual element. Thus, at a given time, the visual element can render one or more child cards over the parent card. For example, as shown in FIGS. 1 and 2, at a first time, the visual element can render the parent card, a first child card over the parent card at a central position, and a portion of a second child card over the parent card adjacent the first child card. At a second time succeeding the first time, in response to a swipe event, the visual element can index to the second card, thereby rendering a portion of the first card adjacent (e.g., to the left of) the second card, the second card in its entirety in the central position, and a portion of a third card opposite (e.g., to the right of) the second card.

3.3 EXPANDED VARIANT CHILD CARDS

Figure 3:
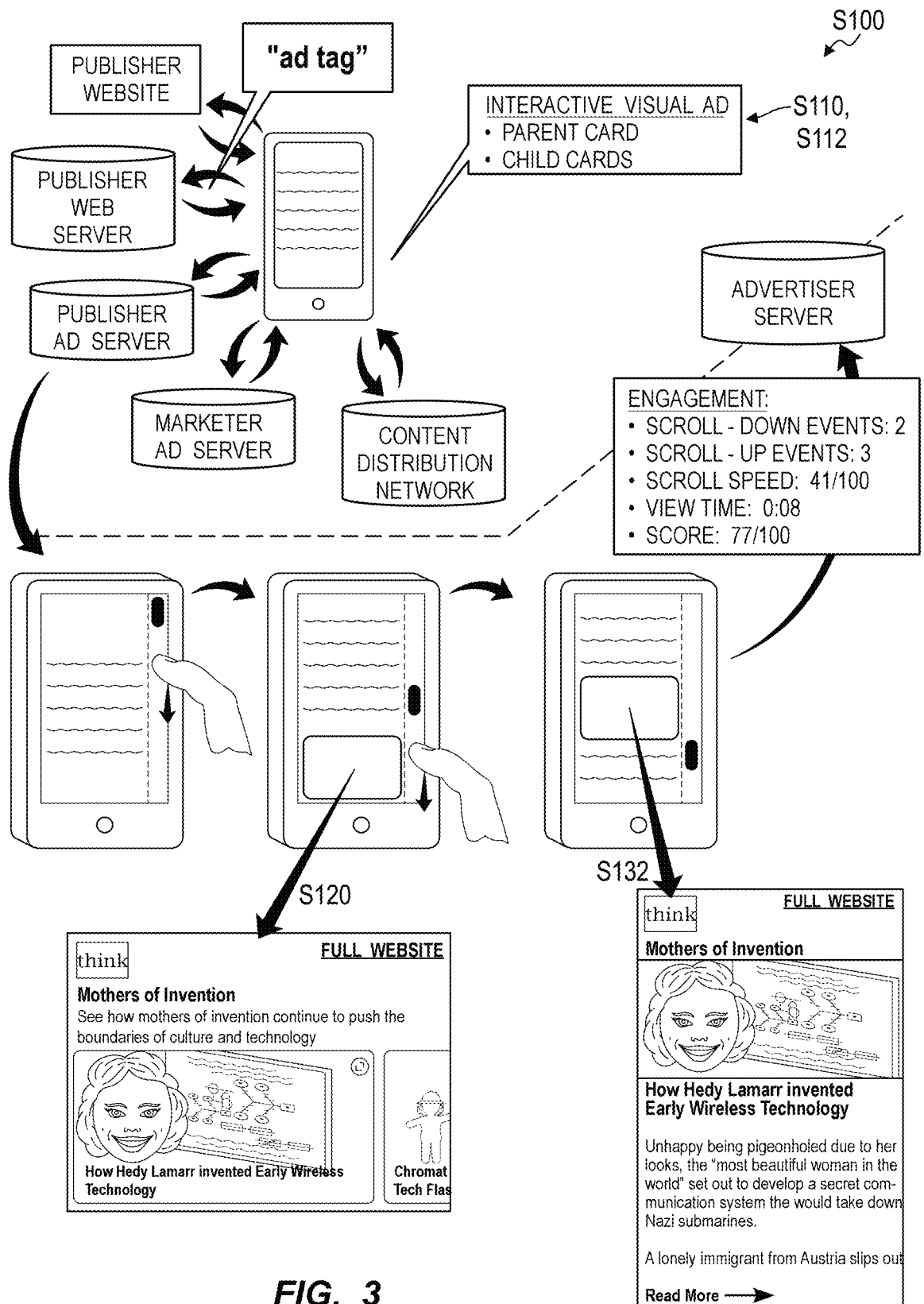
FIG. 3 is a flowchart representation of one variation of the method.

A child card can include additional content that is displayed within the expanded window when a child card in the visual element is selected by the user, thereby defining a third tier of information density for the child card's content stream. For example, an expanded variant of a child card can include a secondary image (e.g., a static image or a GIF) extracted from the corresponding section of the microsite. Additionally, the expanded variant of the child card can include additional text, such as: a chapter abstract, a first sentence, a first 140 characters, an image description for its hero image, a body of text greater than the particular character length described above, etc. extracted (e.g., copied) from the corresponding section or webpage within the microsite. Furthermore, the expanded variant of a child card can include an enlarged version of the corresponding hero image shown in a child card within the visual element. When presented in the expanded window following selection of a card in the visual element, an expanded (i.e., enlarged) variant of a child card can present the enlarged version of the hero image, the section title (described above), and this secondary content, such as arranged vertically under the enlarged hero image, as shown in FIGS. 1, 2, and 3.

Block S132 of the method S100 recites triggering the computing device to open the expanded window over the document. In this implementation, the computer system can render (or "open") the expanded window of a height greater than the height of the visual element and overlaid on top of the document. For example, as described above, the visual element can be embedded into a document between lines of text and/or images. The computer system can, in response to detecting selection of a particular child card, open the expanded window arranged over the text and images of the document such that a portion of the document and the visual element are obscured.

The expanded variant of a child card can also include: a link and anchor tag to the corresponding section or secondary webpage within the external microsite; a link to a (full-screen) video; a link to a map; or a link to any other external content related to the corresponding content stream.

When a child card in the visual element is selected and the expanded window opened, the expanded window can also present an expanded variant of the parent card behind the expanded variants of the child cards. For example, the expanded variant of the parent card can include an enlarged parent hero image containing a link the homepage of the microsite.

3.4 EXTERNAL DOCUMENT

As shown in FIGS. 1 and 2, Block S142 of the method S100 recites, in response to selection of an expanded variant of a particular child card within the expanded window, triggering the computing device to navigate to an external document associated with the particular child card based on a link associated with the particular child card. Generally, the computer system is configured to navigate to a document, such as a web article or webpage related to a particular child card and/or expanded variant of a child card in response to selection of the child card by a user.

In one implementation, the visual element can pull contents of the external document (e.g., a microsite) associated with tiered content (e.g., the parent card) contained within the visual element or expanded window—on top of the current document—thereby enabling the user to access the document into which the visual element is embedded, while viewing the external document.

3.5 DYNAMIC HERO IMAGES

In one variation, a child card contains dynamic content. In one implementation, the dynamic child card includes a dynamic image (e.g., a GIF) representing a sequence of frames, and the visual element indexes through these frames according to a static animation delay time for the dynamic image when the dynamic child card is shown in the visual element (e.g., when the carousel position containing the dynamic child card is centered in the visual element) and when the visual element is shown on the display of the computing device. In a similar implementation, the dynamic child card includes scrolling text, such as a section title and an abstract for the corresponding section, and the visual element cycles through this text at a preset rate when the visual element and dynamic child card are shown on the display of the computing device.

In another implementation, the dynamic child card includes a sequence of frames representing a video segment. In this implementation, when the visual element and the dynamic child card are rendered—within a webpage—on the display of a computing device, the visual element can: seek forward through this sequence of frames as the user scrolls down through the webpage; and seek backward through the sequence of frames within the video as the user scrolls up through the webpage, thereby enabling the user to control which frame in the video sequence is shown within the dynamic child card by scrolling up and down through the webpage. In a similar implementation, the visual element can: automatically replay the video segment when both the visual element and the dynamic child card are shown on the display; seek backward through frames in the video segment when the user scrolls up through the webpage; seek forward through frames in the video segment when the user scrolls down through the webpage; pause replay of the video segment view when the user holds the position of the webpage on the display without scrolling up or down; and then continue replay of the video segment when the user releases a hold or terminates a scroll event. In this implementation, the visual element can replay the video segment within the dynamic child card on a continuous loop while the dynamic child card and visual element are shown on the display of the computing device, or the visual element can set the dynamic child card to present a static hero image once a first replay of the video segment has completed. In the foregoing implementations, when a child card is selected from the visual element to trigger the expanded window, the expanded variant of the dynamic child card can present a static hero image within the expanded window. Alternatively, the dynamic child card can automatically replay the video segment from start to finish (and in a loop)—without scroll and pause controls—when the dynamic child card is shown in the expanded window. The expanded variant of the dynamic child card can also include a link to a complete video (represented by the sequence of frames in the video segment), and the webpage containing the visual element and expanded window can access and replay the complete video within a video player when the expanded variant of the dynamic child card is selected (e.g., rather than triggering the computing device to navigate to the corresponding webpage within the affiliated microsite). (Alternatively, when the webpage containing the visual element is viewed on a laptop or desktop computer, the interactive visual ad can replay the complete video within the dynamic child card, such as over or in place of the hero image in the dynamic child card.)

In another implementation, the dynamic child card can include a dynamic hero image containing a geospatial map, such as showing the location of the computing device relative to a store, theatre, or venue carrying a product or providing a service related to the brand represented by the interactive visual ad. For example, when the dynamic child card is shown in the visual element, the hero image can include a static image; however, the expanded variant of the dynamic child card can query a GPS sensor within the computing device (or IP address or data retrieved from a third-party source) for its current location, query a remote server for relevant locations nearby, and show the location of the computing device and relevant nearby locations on a geospatial map once the expanded window is opened upon selection of a child card from the visual element.

However, in this variation, a dynamic child card can include a dynamic image containing any other dynamic content.

4. CONTENT EXAMPLES

In one example shown in FIG. 2, the interactive visual ad is populated with food recipe content containing ingredients supplied by a food brand. In this example, the interactive visual ad includes: a parent card containing a logo of the food brand, a title reciting "30-minute dinners," and an abstract reciting "Have dinner ready is 30 minutes. Ready. Set. Cook."; and a set of child cards, each child card containing a name of a unique recipe and a hero image of the recipe. In this example, when a child card shown in the visual element within a webpage is selected and an expanded window thus opened over the webpage, the expanded variant of each child card can present: an enlarged version of the hero image; a (complete or incomplete) list of ingredients for its corresponding recipe; and a link to an external webpage or section of an external microsite containing directions for preparing the recipe. In this example, the interactive visual ad can include a child card containing a link to a video (rather than a link to an external webpage) showing preparation of a recipe, a web browser accessing the webpage containing the interactive visual ad can play the video within a video player over the webpage when the expanded variant of this child card is selected by the user.

In another example shown in FIG. 3, the interactive visual ad is populated with editorial content or "thought leadership" from a brand. In this example, the interactive visual ad includes: a parent card containing a logo of the brand, a title reciting "Mothers of Invention," and an abstract reciting "See how mothers of invention continue to push the boundaries of culture technology"; and a set of child cards, each child card containing a name of a unique female inventor and a hero image of the inventor and/or a technology she developed. In this example, when a child card shown in the visual element within a webpage is selected and an expanded window thus opened over the webpage, the expanded variant of each child card can present: an enlarged version of the hero image; a title of an article about the corresponding inventor; a first 300 characters from the article; and a link to an external webpage or section of an external microsite containing the remainder of the article. In this example, the interactive visual ad can include a child card containing a link to a video (rather than a link to an external webpage) showing a technology developed by a corresponding inventor, an interview with the inventor, or a short about the inventor's impact on the culture, and technology; and the web browser accessing the webpage containing the interactive visual ad can play this video within a video player over the webpage when the expanded variant of this child card is selected by the user.

In yet another example, the interactive visual ad is populated with content related to an upcoming theatrical release (i.e., a film). In this example, the interactive visual ad includes: a parent card containing the title of the film, a billboard image for the film (i.e., a billboard parent hero image), and an abstract reciting the release date of the film; a first child card including an image of a first leading actor in the film and the name of the character played by the first leading actor; a second child card including an image of a second leading actor in the film and the name of the character played by the second leading actor; a third child card including an image of the film's director and the name of the director; a fourth child card including an image of a key scene in the film and a "Get the backstory" title; and a fifth child card containing a second billboard image from the fill with a "See the trailer" title. In this example, when a child card shown in the visual element within a webpage is selected and an expanded window thus opened over the webpage: the expanded variant of the first child card can present a second image of the first leading actor and a link to an external webpage or article about the first leading actors experience on set during filming of the film; the expanded variant of the second child card can present a quote from the second leading actor's character in the film and a link to an external webpage or article about the second leading actor's character; the expanded variant of the third child card can present a filmography of the film's director and a link to an external webpage or article about the how this film breaks new cinematic ground; and the expanded variant of the fourth child card can include a link to a trailer for the film, which the web browser can play within a video player over the webpage when the expanded variant of the fourth child card is selected by the user.

In another example, the interactive visual ad is populated with content related to editorial content related to the future automobile market and published in a microsite on behalf of a financial services institution. In this example, the interactive visual ad includes: a parent card containing a logo of the financial services institution, a title reciting "Cars: 2030," and an abstract reciting "In 15 years, the auto industry will change drastically"; and a set of child cards, each child card containing a section title and hero image relating to one of efficiency and power sources, materials technology and regulations, autonomous vehicles, supply chain, competition, internet-connected vehicles, and emerging markets. In this example, when a child card shown in the visual element within a webpage is selected and an expanded window thus opened over the webpage, the expanded variant of each child card can present either: an enlarged version of the hero image and one-sentence abstract of the related section of the editorial content; or an enlarged version of the hero image and a related secondary image. The expanded variant of each child card can also present a link (e.g., in the form of a "Read more→" hyperlink) to the related section of the editorial content in the external microsite, and the website containing the interactive visual ad can open a link in the same browser tab or in a new browser tab when the corresponding child card is selected by the user.

In yet another example, the interactive visual ad is populated with content related to a sports team. In this example, the interactive visual ad includes: a parent card containing the team's logo, the name of the team, and the team's motto; a first child card containing an image of the team's current lineup and a section title indicating a link to learn more about the team's current lineup; a second child card containing an image of the team's stadium and a section title relating to the history of the stadium; a third child card containing an image of last year's MVP and a section title including the player's name and MVP status; a fourth child card containing an image of a significant trophy won by the team and a section title indicating when the trophy was last won by the team; and a fifth child card containing an image of the team playing its rival and a section title regarding the team's prospects and challenges for the upcoming season. In this example, when a child card shown in the visual element within a webpage is selected and an expanded window thus opened over the webpage: the expanded variant of the first child card can present a first paragraph of an article about returning and new members of the team and a link to this complete article on an external webpage; the expanded variant of the second child card can present an abstract on the history of the team's stadium and a link to an external webpage about the stadium, its construction, and important games won in the stadium; the expanded variant of the third child card can present GIF of the player making an MVP-winning play below an expanded version of the image of the player and a link to a complete video segment of this play; the expanded variant of the fourth child card can include a first paragraph of an article related to the team's historic wins of trophy and an article within the microsite describing the team's historic seasons; and the expanded variant of the fifth child card can include a link to an article within the microsite describing other teams that the team will compete with in the upcoming season and the team's competition history with these other teams.

In other examples, the interactive visual ad can be populated with content related to a television show, a sporting event, a clothing brand, a designer, a political candidate, a school, or an automotive manufacturer or automobile model, such as extracted or duplicated in part from editorial content—related to this brand—contained in an external microsite. However, the interactive visual ad can include content in any form from any other brand, microsite, or other content publisher.

5. DOCUMENT INSERTION

Block S130 of the method S100 recites in response to a swipe input over the visual element following insertion of the visual element into a document rendered on a display of a computing device, indexing through the set of child cards rendered over the parent card within the visual element. Generally, in Block S130, the ad platform, ad exchange, publisher ad server, advertising agency ad server, or other content distribution network can insert the interactive visual ad into a webpage or other document accessed by a computing device.

As described above, various Blocks of the method S100 can be executed by an ad platform hosted on a remote computer system, such as a remote server. The ad platform can: retrieve existing media from an external microsite, existing digital cover and media from a remote database, or generated by a journalist, editor, or advertiser through an advertiser portal, etc.; and then—automatically or based on guidance from journalist, editor, or advertiser—transform these media into a visual element, parent card, child cards, expanded variants of child cards, and a callout for an expanded window. The ad platform can package these cards and callout into an interactive visual ad that can later be inserted inline within a document (e.g., a webpage or mobile application) and can make the interactive visual ad available for retrieval by the advertiser; or upload the visual element to an ad exchange, to a publisher ad server, to an advertising agency ad server, or to another content distribution network.

Later, when a user navigates to a publisher's webpage via a web browser or to a mobile application via a native application (hereinafter an "app") executing on her smartphone, smartwatch, tablet, or other computing device, a web server hosted by the publisher can return content or pointers to content for the webpage (e.g., in Hypertext Markup Language, or "HTML", or a compiled instance of a code language native to a mobile operating system), including formatting for this content and a publisher ad tag that points the web browser or app to the publisher's ad server (e.g., a network of external cloud servers). The ad server can then implement an ad selector to select a particular ad to serve to the web browser or app and either: return the selected ad directly to the web browser or app; or return a second ad tag that redirects the browser or app to an advertiser or publisher's ad server. In the latter case, the advertiser or publisher ad server can return a third ad tag that redirects the web browser or app to a content delivery network, which may include a network of cloud servers storing raw creative graphics for the ad, and the content delivery network can return the selected ad to the web browser.

In the foregoing implementation, if the ad server selects the interactive visual ad, the ad server or content delivery network, etc. can return the visual element in the form of an HTML iframe element to the web browser, which can then place the iframe element within the webpage. The visual element can present the parent card and all or a subset of the child cards wrapped within the parent card and selectively trigger the expanded window containing expanded variants of the child cards based on user interactions with the iframe element (i.e., the visual element) according to various Blocks of the method S100.

In one implementation described above, the document into which the visual element is embedded can include native content distinct from the parent card, the set of child cards, and/or expanded variants of the set of child cards.

In another implementation described in U.S. patent application Ser. No. 15/217,879, the visual element: can be inserted into a document rendered within a window executed by the computing device inserted between lines of text and/or images within the document; and can translate within the window inline with the document in response to a scroll input, such as a swipe along a scroll axis of the computing device. For example, at a first time, the visual element can relocate from a first position in the window to a second position above the first position in the window in response to a scroll-up event that moves the document downward within the window; and, at a second time, the visual element can relocate from a third position in the window to a fourth position below the third position in the window in response to a scroll-up event that moves the document downward within the window.

6. ORIENTATION

In one variation in which the interactive visual ad is served to a mobile computing device (e.g., a smartphone or a tablet), the interactive visual ad implements Blocks S130, S132, S140, and S142 to serve related streams of content in four information density tiers—including a first tier of information density in parent card, a second tier in each child card, a third tier in each expanded child card, and a fourth tier in a link to external content (e.g., a microsite)—when the mobile computing device is held in a portrait orientation. However, the interactive visual ad can omit the third tier of information density when the mobile computing device is held in a landscape orientation. In particular, because size (i.e., height and width) of a child card contained in the visual element in landscape orientation may be substantially similar to the size of the expanded variant of child card, the visual element can trigger the web browser containing the interactive visual ad to open a hyperlink assigned to a child card—rather than open the expanded window—when the child card is selected from the visual element. In the landscape orientation, the visual element can also insert additional content—such as a textual abstract or secondary image—from the expanded variant of a child card into the child card when the mobile computing device is held in the landscape orientation. (Alternatively, the visual element can omit the second tier of information density and instead insert an expanded variant of each child into the visual element rather that showing original versions of the child cards in the visual element when the mobile computing device is held in the landscape orientation.)

7. METRICS

As shown in FIG. 3, the visual element (or the ad platform, etc.) can also track user interactions with content contained in the parent and child cards and generate a user engagement metric representing the degree and nature of these interactions. In particular, the visual element can collect data related to interactions between the interactive visual ad and a user viewing the interactive visual ad on a computing device and packages these interaction data into one or more metrics indicative of user engagement with the interactive visual ad.

In one implementation, the visual element: tracks when the ad content is loaded onto the page; tracks a duration that the interaction visual ad is rendered on the display of the computing device; tracks a number of lateral scroll events that shift child cards horizontally into and out of view within the visual element while the visual element is loaded onto a webpage within a web browser; and/or maintains a count of a number of child cards exposed (e.g., viewed) within the visual element. The visual element can then generate an engagement metric that is proportional to this duration, number of lateral scroll events, and/or child card count.

The visual element can also track: a number of instances in which a child card in the visual element is selected (thus triggering the expanded window to open); a duration of time that the expanded window is open; a number of expanded variants of child cards exposed within the expanded window; a number of lateral scroll events that shift expanded child cards horizontally into and out of view within the expanded window; a number of instances in which an expanded variation of a child card in the expanded window is selected to trigger the web browser to navigate to an external site containing related content; and which card or visual element is selected to trigger triggering the computing device to navigate to an external landing page. The visual element can then update the engagement metric proportional to these values.

For example, the parent card can define a first information density tier and a container for child cards. Each child card in the set of child cards can define a second information density tier greater than the first information density tier. (Expanded variants of child cards can define a third information density tier greater than the second information density tier.) The external document can define a fourth information density tier greater than the third information density tier. In this example, the visual element can classify an engagement level of a particular user interacting with the visual element based on a greatest of the first information density tier, the second information density tier, the third information density tier, and the fourth information density tier viewed and/or selected by the user over a predefined impression (e.g., while the visual element is in view within the window). The visual element can then serve the engagement level to a remote interaction database, such as a remote database hosted by the ad publisher.

When aggregating these values into the engagement metric, the visual element can weight these values equally or unequally, such as by assigning a greatest weight to the duration of time that the expanded window is open, a next greatest weight to a number of times that an expanded variant of a child card is selected within the expanded window, then a next greatest weight to a number of expanded child cards shown in the expanded window, etc.

In the variation described above in which a child card includes a link to a video and in which the web browser containing the visual element opens and plays the video when the child card is selected, the visual element can also track a duration of the video that is replayed for the user. For example, the visual element can generate a second engagement metric for the user proportional to the percentage of the video replayed by the web browser, such as by assigning an engagement quartile for the video to the user based on whether less than 25% of the video was replayed (e.g., a first quartile), between 25% and 50% of the video was replayed (e.g., a second quartile), between 50% and 75% of the video was replayed (e.g., a third quartile), or more than 75% of the video was replayed (e.g., a fourth quartile).

In the variation described above in which the interactive visual ad includes a dynamic child card, such as a dynamic child card including a sequence of frames in a video segment, the visual element can also track: a number of vertical scroll events or vertical scroll direction changes that trigger forward and reverse seeking through the video segment within the dynamic child card; and/or a proportion of frames in the video segment replayed within the child card. The visual element can then generate a third engagement metric representing the user's interactions with the dynamic child card based on these values.

The visual element can thus generate multiple unique engagement metrics for various interactions between the user and the visual element, child card, dynamic child cards, videos, expanded variations of child cards, the expanded window, and external links within the interaction visual ad. Alternatively, the visual element can fuse these engagement metrics into a composite engagement metrics representing the user's overall engagement with the interaction visual ad. The visual element can then return these unique engagement metrics and/or the composite engagement metric to the ad platform. However, the visual element can track user interactions with content in the interactive visual ad and transform these interaction data into one or more engagement metrics according to any other method or schema.

8. HOTSPOTS

Figure 4:
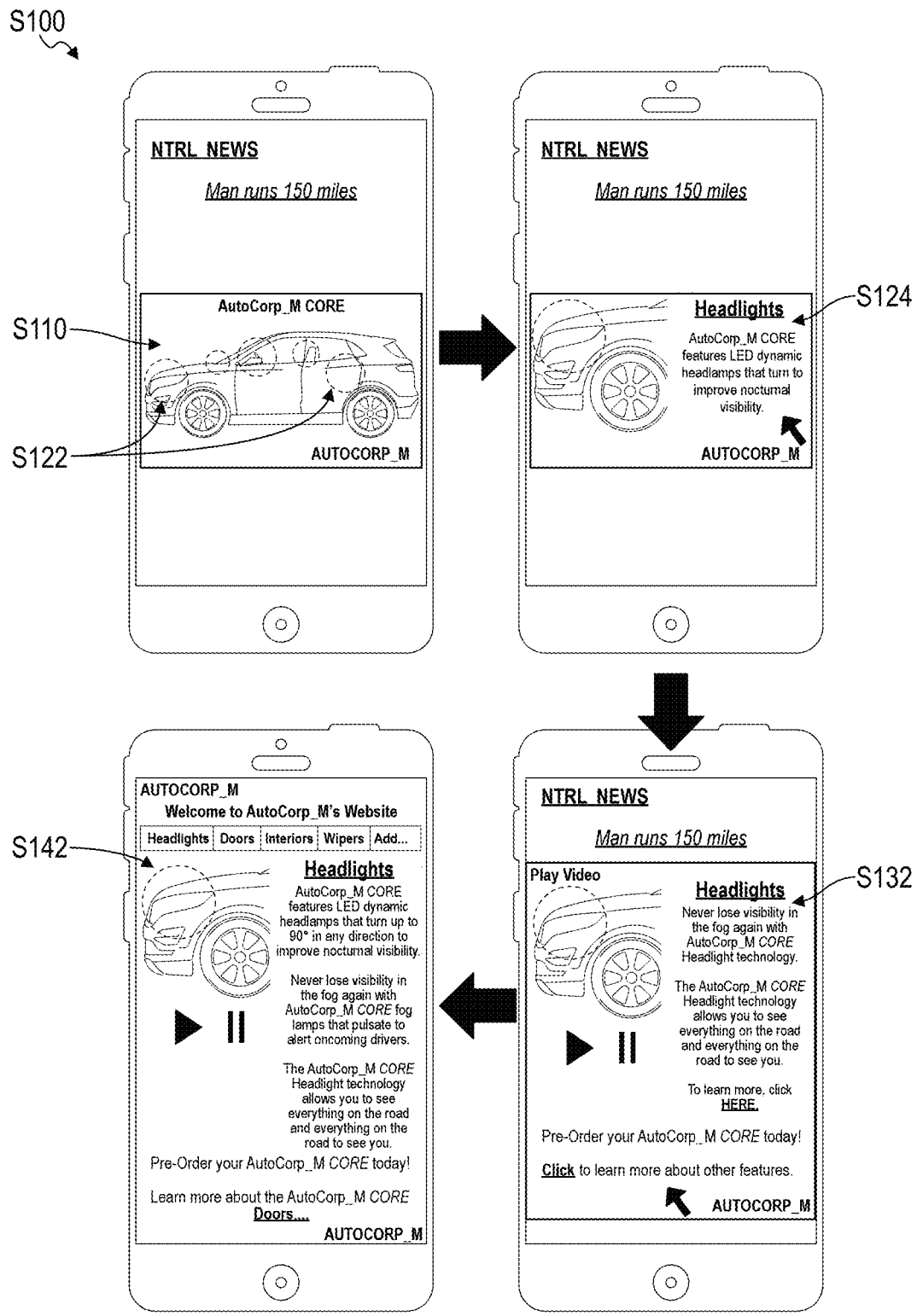
FIG. 4 is a flowchart representation of one variation of the method.

As shown in FIG. 4, one variation of the method includes: inserting a parent card, including advertising content and a set of selection areas (or "hotspots"), into a visual element in Block S110; linking each child card in a set of child cards to a selection area in the set of selection areas, wherein each child card includes a hero image and a link to a related external document in Block 122; following insertion of the visual element into a document rendered on a display of a computing device, in response to detecting selection of a first selection area in the set of selection areas over the parent card, rendering a first child card corresponding to the first selection area over the parent card in the visual element in Block S124; in response to selection of a child card, in the set of child cards, within the visual element, triggering the computing device to open an expanded window—over the document—including expanded variants of each child card in the set of child cards in Block S132; and, in response to selection of an expanded variant of a particular child card, in the set of child cards, within the expanded window, triggering the computing device to navigate to a particular external document associated with the particular child card in Block S142.

Generally, in this variation of the method, the visual element is configured to: render the parent card, such as a hero image or an advertisement, that includes a set of selection areas (or "hotspots") arranged over discrete regions of the parent card; and, in response to selection of a particular selection area by a user, render a child card linked to the particular selection area and representing the selection area in a greater degree of detail (i.e., a higher information density tier). In this variation, the visual element can be configured to selectively conceal higher information density tiers until selected (i.e., explicitly requested through an input) by a user. Thus, the visual element can render information density tiers proportional to a user's interest and engagement with content rendered in the visual element.

8.1 SELECTION AREAS AND LINKED CHILD CARDS

As shown in FIG. 4, Block S110 of the method S100 recites inserting the parent card, which can include a set of selection areas, such as "hotspots" or icons, arranged over discrete areas of the parent card. In Block S122 of the method S100, the computing device can link each child card in a set of child cards to a selection area in the set of selection areas, each child card including a hero image and a link to a related external document; and, in response to detecting selection of a first selection area in the set of selection areas over the parent card, rendering a first child card corresponding to the first selection area over the parent card in the visual element in Block S124. Generally, in Blocks S110, S122, and S124, the visual element links child cards to relevant selection areas of the parent card such that, by selecting a particular selection area, the visual element can render a more detailed view (e.g., zoomed-in view with an abstract describing the selection area) of content encompassed by the particular selection and/or surrounding the particular selection area For example, the parent card can include a hero image depicting a room with a sofa, a side table, a lamp, a rug, a blanket, and a pair of pillows. The computing device can render the primary image with pulsating icons, such as a red dot, arranged over each of the sofa, the side table, the lamp, the rug, the blanket, and the pair of pillows. In response to selection of a pulsating icon arranged over (or proximal) the lamp, the visual element can render a lamp child card including a zoomed-in image of the lamp and a textual abstract describing the lamp, including information such as the designer of the lamp, a year the lamp was first manufactured, and design prizes awarded to the lamp.

However, the set of child cards can detail content encompassed by the selection areas in any other suitable way.

8.2 EXPANDED VARIANTS

As described above, Block S132 of the method S100 recites, in response to selection of a child card, in the set of child cards, within the visual element, triggering the computing device to open an expanded window over the document, the expanded window including expanded variants of each child card in the set of child cards; and Block S142 of the method S100 recites, in response to selection of an expanded variant of a particular child card, in the set of child cards, within the expanded window, triggering the computing device to navigate to a particular external document associated with the particular child card. Generally, in this variation, the visual element displays higher information density tiers related to selection areas of the parent card and/or a particular child card in response to detecting interaction (i.e., selection over the visual element) with the visual element in Blocks S132 and S142.

In the example described above, in response to selection of the lamp child card, the visual element can open an expanded window rendered over the visual element and over the document and can render an expanded variant of the lamp child card including the zoomed-in image, a video of how the lamp works and various rooms in which the lamp has been installed and used, a textual abstract describing the history of the lamp, a short biography of the designer, etc. Upon selection of the expanded variant of the lamp child card, the computing device can navigate to an external website (e.g., an auction website) in which a user may bid on the lamp, learn more about technical specifications of the lamp, manufacture of the lamp, and search for items similar to the lamp.

Alternatively, in another variation, in response to selection of a particular child card within the visual element, the computing device can navigate directly to a particular external document defined in a link (e.g., a URL hyperlink) associated with the particular child card rather than triggering the computing device to navigate to an expanded variant of the particular child card.

8.3 METRICS

As described above, the visual element can classify an engagement level of a user with the visual element based on a greatest information density tier the user interacted with through the visual element during an impression. Generally, the visual element can record and quantify how much information—at what level of abstraction and for what duration of time—a user viewed through the visual element and/or an expanded window, thereby quantifying an impact of the content advertised within the visual element on brand lift and/or conversion for the user.

In particular, the visual element can define a first information density tier characterizing content of the parent card; define a second information density tier characterizing content of the set of child cards and greater than the first information density tier; define a third information density tier characterizing content of the expanded variants of the set of child cards; and define a fourth information density tier corresponding to the external document. In response to an interaction with the first information density tier for less than a threshold duration of time and/or a threshold number of scroll-down and scroll-up events relocating the visual element within the window of the computing device, the visual element can classify the interaction as a lowest engagement level. In response to an interaction with the second information density tier, such as selection of a selection area of the parent card to navigate to a child card, the visual element can classify the interaction as a second engagement level, greater than the lowest engagement level. In response to an interaction with the third information density tier, such as selection of a particular child card to open an expanded variant of the particular child card, the visual element can classify the interaction at a third engagement level greater than the second engagement level. As described above, the visual element can then serve the engagement level to a remote server database, such as an ad server or a database hosted by an ad publisher.

Furthermore, the visual element can calculate a total engagement level accounting for every information density tier viewed in the visual element. For example, the visual element can calculate an engagement level based on a duration each information density tier is viewed in the visual element weighted according to (i.e., proportional to) information density rendered in the visual element.

However, the visual element can classify and quality engagement level with the parent card, a child card, an expanded variant of a child card, and/or the external document related to the parent card in any other suitable way.

9. VIDEO ADVERTISEMENT

Figure 5:
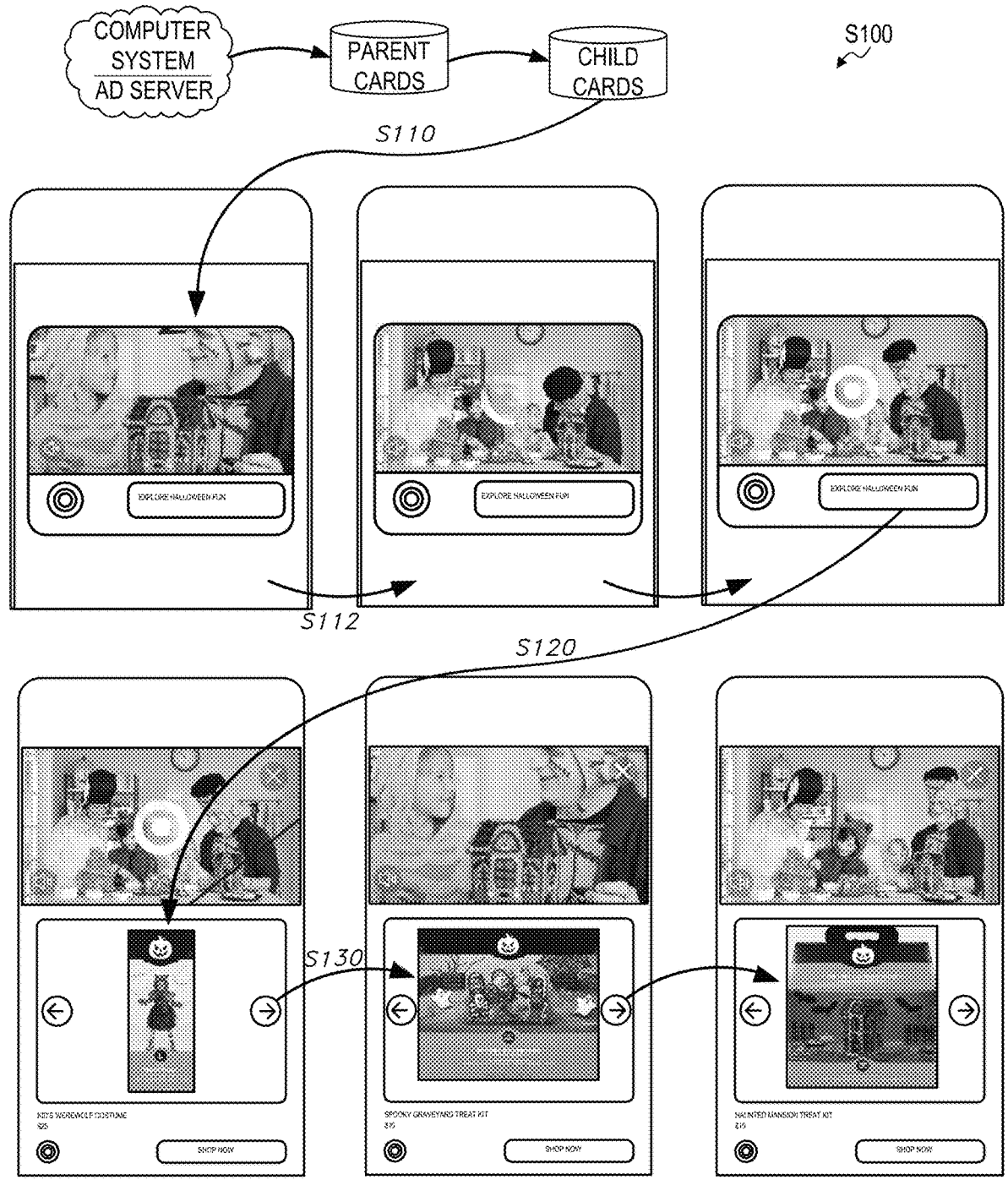
FIG. 5 is a flowchart representation of one variation of the method.

As shown in FIG. 5, one variation of the method includes, at a visual element located within an electronic document rendered by a computing device accessed by a user, loading an interactive advertisement into the visual element, the interactive advertisement including: a parent card including a video advertisement; and a set of child cards, each child card in the set of child cards including advertising content associated with the video advertisement and a link to an external document associated with advertising content presented within the child card. The method further includes, at the visual element, in response to the visual element entering a viewport of the computing device: rendering the parent card within the visual element in Block S110; and triggering playback of the video advertisement from a first frame of the video advertisement in Block S112. The method further includes, at the visual element, during playback of the video advertisement, in response to receiving a first user input over the parent card: rendering a first child card, in the set of child cards, adjacent the video advertisement in Block S120; and, in response to receiving a second user input over the first child card, indexing from the first child card to a second child card, in the set of child cards and rendering the second child card adjacent the video advertisement in Block S130.

Generally, in this variation, the visual element is configured to: render a parent card, such as a video advertisement, configured to receive user inputs (i.e., selections) within the visual element; and, in response to selection of a particular region of the parent card (e.g., selection of the video advertisement), render a first child card, in a set of child cards, adjacent the video advertisement. The visual element can then index between child cards, in the set of child cards, to render additional child cards responsive to inputs entered by the user. The visual element can therefore be configured to selectively conceal higher information density tiers (e.g., child cards) until selected (i.e., explicitly requested through an input) by a user. Thus, the visual element can render information density tiers proportional to a user's interest and engagement with content rendered within the visual element.

9.1 APPLICATIONS

Generally, in this variation, the visual element and/or ad platform can increase user engagement with advertising content presented within the visual element by: initially drawing the user's attention to the video advertisement of the parent card; and enabling the user to selectively and rapidly access additional information—contained in the set of child cards—related to advertising content presented in the video advertisement, without leaving the initial electronic document (e.g., webpage) at which the visual element (e.g., loaded with the interactive visual advertisement) is located, thereby decreasing latency between the user viewing the video advertisement and accessing additional information related to content in the video advertisement. Additionally, by enabling the user to access this additional information directly at the interactive visual advertisement, the visual element and/or ad platform can enable ad publishers to limit or reduce outbound traffic (e.g., web traffic from a publisher's webpage to an external webpage linked to advertising content) generated by users seeking additional information regarding content in advertisements.

By enabling users to selectively access this additional information—such as by selecting a video advertisement included in a parent card to view a set of child cards related to the video advertisement—the visual element and/or ad platform can minimize disruption to users that exhibit little or no interest in the interactive visual advertisement, while maximizing exposure of users exhibiting engagement with the interactive visual advertisement to additional advertising content related to the video advertisement.

Further, the visual element can track user interactions with the interactive visual advertisement to derive engagement metrics related to the video advertisement and the set of child cards, both independently and in combination. The visual element can then leverage this engagement data to update the interactive visual advertisement in real-time and/or to selectively serve future interactive visual advertisements to this user. In particular, by characterizing engagement of the user with both the video advertisement and the set of child cards independently, the visual element and/or ad platform can: identify a particular video advertisement, a particular set of child cards, a particular advertisement format or animation of the parent card and/or child cards that the user may be more likely to engage with for future interactive visual advertisements served to this user; and/or update the interactive visual advertisement in real-time to increase engagement with the interactive visual advertisement, such as by indexing from a first child card to a second child card or expanding a size of the video advertisement relative to a child card.

9.2 EXAMPLES

In one example, an interactive video advertisement includes a parent card including: a video advertisement (e.g., for a holiday campaign) associated with a first brand and a call-to-action (e.g., "Click here to see more!") arranged adjacent the video advertisement. The interactive visual advertisement can further include a set of child cards packaged with the parent card, each child card including advertising content related to the video advertisement. The parent card can be configured to receive an input (e.g., swipes, click) entered by the user to reveal the set of child cards (or a subset of the child cards) to the user.

In particular, in this example, the interactive visual advertisement can be loaded into a visual element inserted in an electronic document (e.g., a webpage) rendered by a mobile computing device accessed by a user. Then, in response to the visual element entering a viewport of the mobile computing device, the visual element can: render the parent card within the visual element; and trigger playback of the video advertisement from a first frame of the video advertisement. Then, during playback of the video advertisement, in response to receiving selection of the video advertisement, including advertising content related to the video advertisement (e.g., related to the holiday campaign), the visual element can: trigger the mobile computing device to open an expanded window over the electronic document; render a first child card, in the set of child cards, adjacent the video advertisement within the expanded window, the first child card including advertising content (e.g., a hero icon or image, a gif, a video) related to the video advertisement (e.g., related to holiday decorations); and continue playback of the video advertisement.

Then, in response to a user input (e.g., a swipe) over the first child card, the visual element can: render a transition from the first child card to a second child card, in the set of child cards, the second child card including advertising content related to the video advertisement (e.g., related to holiday foods); and render the second child card adjacent the video advertisement in replacement of the first child card. In response to the user selecting the second child card (e.g., related to holiday foods), the visual element can trigger the mobile computing device to open an external webpage linked to the second child card, such as an external webpage at which the user may directly purchase products related to the second child card.

In another example, an interactive video advertisement can be loaded into a visual element loaded within an electronic document (e.g., a webpage) rendered by a desktop computing device accessed by a user. Then, in response to the visual element entering a viewport of the desktop computing device, the visual element can render a parent card—including a video advertisement (e.g., for a cable television network)—within the visual element and initiate playback of the video advertisement. In this example, the parent card can define a first dimension (e.g., a height or a width) less than a second dimension of the visual element, such that the parent card—including the video advertisement—occupies a first region of the visual element, the first region defining a first area. The visual element can mask a second region of the visual element (e.g., not occupied by the parent card)—distinct from the first region—to match a background of the electronic document, such that the parent card visually appears to fill the visual element when viewed by the user.

Then, during playback of the video advertisement, in response to the user selecting the video advertisement within the visual element, the visual element can: expand the video advertisement to fill the first region of the visual element; render a first child card, in a set of child cards linked to the parent card, adjacent the video advertisement within the second region of the visual element, the second child card including advertising content (e.g., a hero image, a gif, a video, a call-to action) related to the video advertisement (e.g., related to a particular television show on the cable television network); and continue playback of the video advertisement within the visual element.

9.3 INTERACTIVE VIDEO ADVERTISEMENT

As shown in FIG. 5, Block S110 of the method recites loading an interactive advertisement into a visual element loaded within an electronic document rendered by a computing device accessed by a user. The interactive video advertisement can include: a parent card including a video advertisement; and a set of child cards linked to the parent card and including advertising content associated with the video advertisement.

In one implementation, the ad platform hosts an advertiser portal that can be accessed by a human representative of an advertiser to populate a generic interactive visual ad template with content: from an external microsite (e.g., a single webpage or cluster of highly-cohesive pages generated by or on behalf of a brand); from marketing cover; from brand cover; from an article; or from other textual and visual digital media containing multiple discrete subthemes, sections, chapters, episodes, members, or divisions, etc. unified under a common (i.e., global) theme.

For example, an advertiser can access an instance of the advertiser portal through a native application or through a web browser executing on a desktop computer, a laptop computer, a smartphone, or a tablet and then enter a URL of a microsite; and the advertiser portal can automatically scrape a parent hero image, parent abstract, and parent title from the top of the microsite (or main page of the microsite), scrape a hero image, section title, and secondary media from each section (or discrete webpage) within the microsite, and populate the parent, child, and expanded variant child cards from these media. Alternatively, the advertiser can upload media (e.g., text, static images, videos, etc.) into the advertiser portal and manually populate template parent, child, and expanded variant child cards with these media to manually create the interactive visual ad. However, the ad platform can implement any other method or technique to access textual and visual media and to aggregate these media in multiple discrete streams of content—each containing content in multiple discrete information density tiers—affiliated with a common theme (i.e., multiple child cards unified under one parent card).

9.3.1 Parent Card

The parent card can define a lowest information density tier and include a video advertisement (e.g., depicting video advertising content distinct from content of the electronic document). Additionally, the parent card can include: a title and/or a general abstract, such as a title and abstract extracted directly from the microsite, or such as a title and a caption (e.g., a first sentence, the first ten words, or the first 50 characters following the title on the microsite); a primary icon (e.g., a brand icon of a brand associated with the video advertisement); and/or a call-to-action (or "CTA"), such as a textual statement or icon configured to persuade a user to perform a particular task, such as purchasing a product, signing up for a newsletter, or clicking-through to a landing page for a brand or product. The parent card can further include a link to external content associated with the video advertisement, such as a link to the microsite with an anchor tag for the top of the microsite or a link to a homepage of the microsite.

For example, as shown in FIG. 5, the parent card can include: a video advertisement; a call-to-action (e.g., "Explore Halloween fun") adjacent the video advertisement within the visual element; and a brand icon adjacent the call-to-action within the visual element. In this example, the interactive visual advertisement can be configured to: render a child card adjacent the video advertisement responsive to receiving a user input over the call-to-action; and trigger the computing device to navigate to an external document (e.g., a microsite associated with the video advertisement) responsive to receiving a user input over the brand icon. Additionally and/or alternatively, in response to receiving a user input over the video advertisement, the visual element can be configured to render the child card adjacent the video advertisement.

In one implementation, the parent card can span the width and/or height of the visual element to define a static background image or color over which the video advertisement is rendered. In this implementation, the parent card can include a call-to-action and/or brand icon overlaid the static background image (or color) and/or overlaid the video advertisement. In another implementation, the parent card can include the video advertisement spanning the width and/or height of the visual element, such that the video advertisement fills the visual element.

9.3.2 Child Card

The interactive visual advertisement can include a set of child cards linked to the parent card and associated with the video advertisement. In particular, the visual element (or the ad platform) can package the parent card—including the video advertisement—with the set of child cards including advertising content (e.g., images, videos, gifs, text) associated with the video advertisement. The set of child cards can define a second information density tier greater than a first information density tier of the parent card. Further, each child card, in the set of child cards, can include a link to an external webpage associated with the child card (e.g., associated with advertising content presented within the child card).

For example, the parent card can include a video advertisement for a particular collection (e.g., a holiday collection, a summer collection, an outdoor collection) associated with a particular brand. In this example, each child card can include advertising content (e.g., an image, a gif, a video, a text description, a call-to-action) for a particular product in the particular collection. A user may then click on the parent card (e.g., over the video advertisement or over a call-to-action) to reveal a first child card corresponding to a first product in this particular collection. The user may then swipe over the first child card to reveal a second child card, in the set of child cards, corresponding to a second product in this particular collection.

In one implementation, as shown in FIG. 5, each child card, in the set of child cards, can include: a hero image (e.g., a static image, a gif, an animated image) associated with the parent card; a link to an external document (e.g., an external website) associated with the child card and/or hero image; a call-to-action; a primary icon (e.g., a brand icon); and/or a text string (e.g., a title, a product description, an excerpt from the corresponding external website).

9.4 VIDEO PLAYBACK

As shown in FIG. 5, Block S110 of the method recites, in response to the visual element entering a viewport of the computing device: rendering the parent card within the visual element; and triggering playback of the video advertisement from a first frame of the video advertisement.

The visual element can be configured to automatically trigger playback of the video advertisement, within the visual element, responsive to the visual element entering a viewport of the computing device, such that playback of the video advertisement starts once the video advertisement is visible to the user. Further, the visual element can be configured to replay the video advertisement within the visual element on a continuous loop while the video advertisement is rendered on the display (e.g., within the viewport) of the computing device. Alternatively, in one variation, the visual element can set the parent card and/or child cards to render a static hero image responsive to a quantity of replays of the video advertisement exceeding a threshold quantity of replays (e.g., one replay, three replays, ten replays).

For example, in response to the visual element moving from an initial position (e.g., initial vertical position) outside the viewport to a first position (e.g., a first vertical position) within the viewport, the visual element can: render the parent card, including the video advertisement, within the visual element; and trigger playback (e.g., forward playback) of the video advertisement from a first frame of the video advertisement toward a final frame of the video advertisement. Then, in response to the visual element rendering the final frame of the video advertisement, the visual element can: render the first frame in replacement of the final frame; and trigger playback of the visual element from the first frame toward the final frame.

Additionally, in one implementation, during playback of the video advertisement, in response to the visual element moving from within the viewport to a second position (e.g., a vertical position) outside the viewport of the computing device, the visual element can: pause playback of the video advertisement at a particular frame; and, in response to the visual element moving from the second position to a third position within the viewport, initiate playback of the video advertisement from the particular frame (e.g., the last frame rendered while the video advertisement was in the viewport). Alternatively, in another implementation, the visual element can continue playback of the video advertisement once the visual element initially enters the viewport. Alternatively, in yet another implementation, the visual element can automatically trigger playback of the video advertisement from the first frame each time the visual element reenters the viewport (e.g., after exiting the viewport).

9.4.1 Rendering a Child Card

During playback of the video advertisement, in response to receiving a user input (e.g., a click, a swipe) over the parent card, the visual element can render a first child card, in the set of child cards, adjacent the video advertisement. In particular, in response to receiving a user input over a region (e.g., containing the video advertisement and/or containing a call-to-action) of the parent card at a first time, the visual element can: render the first child card adjacent the video advertisement; and seamlessly continue forward playback (e.g., without interruption) of the video advertisement from a frame rendered within the visual element at approximately the first time.

Additionally, during playback of the video advertisement, in response to receiving a user input over the parent card (e.g., selection of the video advertisement), the visual element (or computer system) can: render a first child card, in the set of child cards, adjacent the video advertisement; and continue playback of the video advertisement. In particular, the visual element (or computer system) can seamlessly continue playback of the video advertisement before, during, and after rendering of the first child card adjacent the video advertisement.

In one implementation, as shown in FIG. 5, in response to receiving a user input over the parent card, the visual element can trigger the computing device (e.g., a mobile computing device), accessed by the user, to render an expanded window over the visual element, the expanded window including the video advertisement and a first child card, in the set of child cards, adjacent the video advertisement within the expanded window. In this implementation, the computing device can render the expanded window defining a height greater than a height of the visual element and overlaid the electronic document (e.g., webpage) containing the visual element.

For example, the visual element—loaded with the interactive visual advertisement—can be embedded in an electronic document between lines of text and/or images distinct from the interactive visual advertisement. Then, during playback of the interactive visual advertisement within the visual element, in response to selection of a call-to-action (e.g., "Explore in fullscreen" or "Click to browse the collection") included in the parent card rendered within the visual element, the visual element can trigger the computing device to render an expanded window arranged over the lines of text and/or images of the electronic document. Further, the visual element can trigger the computing device to render a first child card adjacent the video advertisement within the expanded window, while continuing playback of the video advertisement, from a last frame rendered within the visual element, within the expanded window.

The visual element can therefore delay expansion of the interactive visual advertisement (e.g., to fullscreen) and/or rendering of additional information density tiers until the user exhibits engagement with the interactive visual advertisement (e.g., via selection of the video advertisement, via user input over a call-to-action). The visual element or ad platform can thus minimize disruption to users that exhibit little or no interest in the interactive visual advertisement, while maximizing exposure of users exhibiting engagement with the interactive visual advertisement to additional advertising content related to the video advertisement.

Alternatively, in another implementation, in response to receiving a user input over the parent card, the visual element can: render a first child card within the visual element, adjacent the video advertisement; and continue playback of the video advertisement within the visual element. In this implementation, the visual element can adjust a size (e.g., a height and/or a width) of the video advertisement to fit both the video advertisement and the child card within an area defined by the visual element.

9.4.2 Indexing Through Child Cards

As described above, in response to receiving a user input (e.g., a click, a swipe) over the parent card, the visual element can render a first child card, in the set of child cards, adjacent the video advertisement. Then, in response, to receiving an additional user input (e.g., a swipe, a click) over the first child card, the visual element can: index from the first child card to a second child card, in the set of child cards; and render the second child card adjacent the video advertisement (e.g., within the expanded window or within the visual element).

In one implementation, the set of child cards can be arranged within a virtual card carousel that rotates horizontally to reveal each child card, in the set of child cards. For example, in response to receiving a user input (e.g., a click, a swipe) over the parent card, the visual element can: access a set of child cards arranged in a card carousel, each child card, in the set of child cards defining a position within the card carousel; and render a first child card, defining a first position within the card carousel, adjacent the video advertisement. Then, in response to detecting a swipe input entered by the user over the first child card, the visual element can: index the card carousel from the first position to a second position occupied by a second child card, in the set of child cards; and render the second child card, in replacement of the first child card, adjacent the video advertisement.

In this implementation, the visual element can render a set of child cards (e.g., one, two, or three child cards) adjacent the video advertisement. In one example, in response to receiving a user input over the interactive visual advertisement, the visual element can: render a portion of a first child card below the video advertisement; render a second child card below the video advertisement and adjacent the first child card; and render a portion of the third card below the video advertisement and adjacent the second child card opposite the first child card. In another example, the visual element can render a single child card adjacent the video advertisement.

Additionally and/or alternatively, in another implementation, the visual element can render a transition between each child card, in the set of child cards. For example, in response to receiving a user input over a first child card, in the set of child cards, the visual element can render a transition from the first child card to the second child card including: rendering a first portion of the first child card; and rendering a second portion of the second child card.

Additionally, in this implementation, the visual element can render the transition according to a responsive animation (e.g., a bounce effect, a 3D rotation effect, a pulse effect) defined by the interactive visual advertisement. Thus, by animating this transition between child cards, the visual element can draw greater attention from the user and encourage the user to interact with (e.g., by swiping through) the set of child cards. In this implementation, the visual element can render the set of child cards in a particular arrangement to further draw the user's attention to the set of child cards, such as: arranged about a 3D cube that rotates responsive to user inputs; arranged as a deck of child cards that shuffles through child cards responsive to user inputs; and/or arranged about a 3D wheel that spins responsive to user inputs. However, the interactive visual advertisement can define an animation of any other type responsive to user inputs and can include child cards presented in any other arrangement.

In particular, in this implementation, in response to receiving a user input (e.g., a swipe input) over a first child card, in the set of child cards, the visual element can: render a transition, defining a responsive animation, from the first child card to the second child card adjacent the video advertisement according to a responsive animation; and render the second child adjacent the video advertisement in replacement of the first child card. In one example, the set of child cards can be arranged to form a 3D polyhedron (e.g., a pyramid, a cube, an octahedron) including a set of faces, such that each child card, in the set of child cards, defines a face, in the set of faces, of the polyhedron. In particular, in this example, in response to selection of the parent card, the visual element can render a first face of a cube, corresponding to a first child card, adjacent the video advertisement. Then, in response to a user input (e.g., a click, a swipe) over the first child card, the visual element can rotate the cube to reveal a second face of the cube, such that a portion of the first face and a portion of the second face of the cube are rendered adjacent the video advertisement. The visual element can continue to rotate the cube until the second face, corresponding to a second child card, in the set of child cards, completely replaces the first child card adjacent the video advertisement. In this example, the visual element can also render additional visual effects such as rendering a "bounce" effect during transition between faces of the cube and/or animating text within the set of child cards. Thus, by rendering the set of child cards in a 3D cube arrangement and animating the transition between child cards, the visual element can draw the user's attention to the set of child cards of the interactive visual advertisement, which can be distinct from other 2D and/or static content on the webpage.

Alternatively, in the preceding example, the visual element can initially render the first face, a portion of the second face, and a portion of a third face—orthogonal the first and second face—such that the user immediately perceives the set of child cards as a 3D cube.

Thus, by animating this transition between child cards, the visual element and/or ad platform can increase the user's interest in engaging with the interactive visual advertisement and in advertising content contained within the interactive visual advertisement (e.g., by drawing the user's attention to this animation).

9.4.3 External Electronic Document

In response to receiving a user input over a child card, in the set of child cards, the visual element can trigger the computing device, accessed by the user, to navigate to (e.g., open) an external document (e.g., an external webpage) associated with video advertisement.

In one implementation, each child card can include an unique link corresponding to an external document associated with advertising content presented in the child card. For example, in response to selection of a first child card, in the set of child cards, the visual element can trigger the computing device to navigate to a first webpage, of a first website, corresponding to a first hero image included in the first child card. However, in this example, in response to selection of a second child card, in the set of child cards, the visual element can trigger the computing device to navigate to a second webpage, of the first website, corresponding to a second hero image included in the second child card. Alternatively, in another implementation, each child card, in the set of child cards, can include a link to a generic external document (e.g., a single webpage) associated with the video advertisement.

9.5 VIDEO ADVERTISEMENT FORMATS

In one variation, the interactive visual advertisement can include a dynamic video advertisement including dynamic images (e.g., a GIF) representing a sequence of frames, and the visual element indexes through these frames responsive to scroll inputs entered by the user within the electronic document. Additionally and/or alternatively, in this variation, the child card can include a dynamic video advertisement and/or dynamic hero images, as described above.

In particular, as described in U.S. patent application Ser. No. 15/217,879, which is incorporated in its entirety by this reference, a user may navigate through a webpage or other external document loaded with the visual element. The visual element can then: seek or step forward through a sequence of frames (or a subset of the sequence of frames) during scroll-down events; and seek backward through the sequence of frames (or subset of frames) during scroll-up events. The visual element can thus link content of the video advertisement rendered within the visual element at any given time to the (vertical) position of the visual element rendered within the external document by the computing device, thereby enabling the user both to view the sequence of frames as a short (e.g., one-second) video clip by quickly scrolling the visual element between the bottom and top of the window and to visually consume each frame separately by moving the visual element to discrete positions within the window rendered on the computing device.

For example, at a visual element loaded within an electronic document accessed by a computing device associated with a user, the visual element can: during a first scroll event, detect relocation of the visual element from an initial position outside of the viewport to a first position within the viewport; and, in response to termination of the first scroll event, replay the video advertisement forward, within the visual element, from a first frame in the video advertisement to a second frame in the video advertisement at a preset video frame rate, the second frame succeeding the first frame in the video advertisement. Then, during a scroll-down event, the visual element can: detect relocation of the visual element from the first position to a second position above the first position at a first scroll rate; replay the video advertisement forward, within the visual element, from the second frame to a third frame at a first frame rate proportional to the first scroll rate, the third frame succeeding the second frame in the digital advertisement; and, in response to termination of the scroll-down event, replay the video advertisement forward, within the visual element, from the third frame to a fourth frame at the preset video frame rate, the fourth frame succeeding the third frame in the digital video. Further, during a scroll-up event, the visual element can: detect relocation of the visual element from the second position to a third position below the second position at a second scroll rate; and replay the video advertisement backward, within the visual element, from the fourth frame to a fifth frame at a second frame rate proportional the second scroll rate, the fifth frame between the first frame and the fourth frame in the video advertisement.

9.6 ENGAGEMENT

As described above, the visual element (or the ad platform, etc.) can track user interactions with advertising content served in the visual element. In particular, the visual element can: collect engagement data (e.g., clicks, scrolls, swipes, viewability, video completion) related to interactions between the interactive video advertisement and a user viewing the interactive video advertisement on a computing device; and package these engagement data into one or more metrics indicative of user engagement with the interactive video advertisement. For example, the visual element can track user interactions with an interactive video advertisement to characterize user engagement with the interactive video advertisement based on: a proportion of the video advertisement viewed by the user; a quantity of replays of the video advertisement; on a quantity of user inputs (e.g., clicks, swipes, tilts, gestures) entered by the user at the interactive advertisement; a quantity of clicks over the video advertisement; a quantity of swipes between child cards; a maximum information density tier (e.g., parent card, child card, microsite) viewed by the user; a duration of time the user spent interacting with the interactive visual advertisement; etc.

In one implementation, the visual element can track a first type of user interactions related to interactions with the video advertisement and a second type of user interactions related to interactions with the set of child cards. In this implementation, the visual element can leverage this interaction data to inform future interactive visual advertisement served to this user and/or to update the interactive visual advertisement in real-time to increase user engagement with the interactive visual advertisement.

For example, for an interactive visual advertisement loaded in a visual element located on a webpage rendered by a computing device accessed by a user, the visual element can track a quantity of video completions (e.g., a quantity of replays) of a video advertisement, in the interactive visual advertisement, to characterize a first engagement score (e.g., level or degree of engagement) for the user interacting with the video advertisement. Additionally, the visual element can track a quantity of lateral swipe inputs (e.g., lateral scrolls) entered by the user to index between child cards, in a set of child cards linked to the video advertisement, to characterize a second engagement score for the user interacting with the set of child cards.

In this example, if the first engagement score is relatively high and the second engagement score is relatively low—indicating the user is highly engaged with the video advertisement but less engaged with the set of child cards—the visual element can update the set of child cards in real-time to increase engagement of the user with the set of child cards, such as by: automatically indexing to a next child card, in the set of child cards, after a threshold duration (e.g., if the user has not manually indexed to the next child card); animating a child card or the set of child cards (e.g., shuffling through the set of child cards, jostling the child card, expanding the child card) to draw the user's attention to the set of child cards; replacing the set of child cards with a new set of child cards; etc. Additionally and/or alternatively, the visual element and/or ad platform can leverage the first and second engagement score to selectively serve a next interactive visual advertisement to this user, such as by serving the user a next interactive video advertisement including the same video advertisement and a new set of child cards.

Alternatively, in another example, if the first engagement score is relatively low and the second engagement score is relatively high—indicating the user is highly engaged with the set of child cards but less engaged with the video advertisement (e.g., the user watched less than a threshold proportion of the video advertisement before engaging with the set of child cards)—the visual element can update the interactive visual advertisement in real-time to increase engagement of the user with the video advertisement, such as by: expanding a size of the video advertisement relative the child card rendered adjacent the video advertisement; replacing the video advertisement with a new (related) video advertisement; etc. Additionally and/or alternatively, the visual element and/or ad platform can leverage the first and second engagement score to selectively serve a next interactive visual advertisement to this user, such as by serving the user a next interactive video advertisement including a different video advertisement with the same or a similar set of child cards or including a similar video advertisement in a different advertisement format (e.g., video, gif, format responsive to scroll).

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for serving interactive content to a user comprising:
    inserting a parent card, comprising a video advertisement, into a visual element inserted within an electronic document rendered by a computing device accessed by the user;
    inserting a set of child cards into the visual element to generate an interactive advertisement comprising the parent card and the set of child cards, each child card, in the set of child cards, comprising:
        advertising content associated with the video advertisement; and
        a link to an external electronic document associated with advertising content presented within the child card;
    in response to the visual element entering a viewport of the computing device:
        rendering the parent card within the visual element; and
        triggering playback of the video advertisement, within the visual element, from a first frame of the video advertisement; and
    during playback of the video advertisement:
        in response to selection of the parent card by the user:
            continuing playback of the video advertisement; and
            rendering a first child card, in the set of child cards, adjacent the video advertisement; and
        in response to a first user input at the first child card:
            continuing playback of the video advertisement;
            indexing from the first child card to a second child card in the set of child cards; and
            rendering the second child card, in replacement of the first child card, adjacent the video advertisement.

2. The method of claim 1, further comprising, during playback of the video advertisement, in response to rendering a final frame, succeeding the first frame, of the video advertisement, triggering playback of the video advertisement forward from the first frame toward the final frame.

3. The method of claim 1, wherein indexing from the first child card to the second child during playback of the video advertisement card comprises rendering a transition, defining a responsive animation, from the first child card to the second child card, during playback of the video advertisement, adjacent the video advertisement.

4. The method of claim 3, wherein rendering the transition from the first child card to the second child comprises rendering a first portion of the first child card and a second portion of the second child card adjacent the video advertisement.

5. The method of claim 3:
    wherein rendering the first child card comprises rendering a first face of a polyhedron comprising the first child card;
    wherein rendering the transition from the first child card to the second child comprises rotating the polyhedron in a first direction to reveal a second face of the polyhedron, the second face adjacent the first face and comprising the second child card; and
    wherein rendering the second child card comprises rendering the second face of the polyhedron.

6. The method of claim 1, wherein continuing playback of the video advertisement and rendering the first child card adjacent the video advertisement in response to selection of the parent card comprises, in response to selection of the parent card:
    triggering the computing device to open an expanded window over the electronic document;
    rendering a current frame of the video advertisement within the expanded window;
    continuing playback of the video advertisement from the current frame; and
    rendering the first child card adjacent the video advertisement within the expanded window.

7. The method of claim 1:
wherein rendering the parent card within the visual element comprises rendering the parent card within the visual element, the parent card comprising:
the video advertisement; and
a first call to action arranged adjacent the video advertisement;
wherein rendering the first child card comprises rendering the first child card comprising:
a first image comprising advertising content related to the video advertisement;
a first call to action arranged adjacent the first image within the first child card; and
a first link to a first webpage within a microsite associated with the video advertisement, the first webpage associated with advertising content presented within the first image;
wherein rendering the second child card comprises rendering the second child card comprising:
a second image comprising advertising content related to the video advertisement;
a second call to action arranged adjacent the second image within the second child card; and
a second link to a second webpage within the microsite, the second webpage associated with advertising content presented within the second image.

8. The method of claim 1, further comprising, in response to receiving user input over a particular child card, in the set of child cards, comprising a first link to a first external electronic document associated with advertising content presented within the particular child card, triggering the computing device to navigate to the first external electronic document based on the first link.

9. The method of claim 1:
wherein triggering playback of the video advertisement in response to the visual element entering the viewport of the computing device comprises, in response to a first scroll event that moves the visual element to a first position within the viewport, triggering playback of the video advertisement forward within the visual element; and
further comprising:
in response to a scroll-down event that moves the visual element from the first position within the viewport to a second position above the first location within the viewport, seeking forward through frames of the video advertisement; and
in response to a scroll-up event that moves the visual element from the second position to a third position below the second position within the viewport, seeking backward through frames of the video advertisement.

10. The method of claim 1:
wherein rendering the parent card comprises rendering the parent card defining a first information density tier; and
wherein rendering the first child card comprises rendering the first child card defining a second information density tier exceeding the first information density tier.

11. The method of claim 1, further comprising:
characterizing a first engagement score for the user interacting with the parent card based on selection of the video advertisement by the user during playback of the video advertisement; and
characterizing a second engagement score for the user interacting with the set of child cards based on a quantity of user inputs entered by the user at the set of child cards.

12. A method for serving interactive content to a user comprising:
inserting a parent card, comprising a video advertisement, into a visual element loaded within an electronic document rendered within a display of a computing device accessed by the user;
in response to the visual element entering a viewport of the computing device:
rendering the parent card within the visual element; and
triggering playback of the video advertisement within the visual element; and
during playback of the video advertisement:
in response to selection of the parent card:
triggering the computing device to open an expanded window over the electronic document;
continuing playback of the video advertisement within the expanded window; and
rendering a first child card, in a set of child cards, adjacent the video advertisement within the expanded window, the first child card comprising advertising content related to the video advertisement and a first link to a first external electronic document associated with advertising content presented within the first child card; and
within the expanded window, in response to selection of the first child card, triggering the computing device to navigate to the first external electronic document based on the first link.

13. The method of claim 12:
wherein rendering the parent card within the visual element loaded within the electronic document comprises rendering the parent card within the visual element loaded within the electronic document, the parent card comprising content of a first type, the electronic document comprising a webpage comprising native content of a second type distinct from the first type; and
wherein rendering the first child card adjacent the video advertisement within the expanded window comprises rendering the first child card adjacent the video advertisement within the expanded window, the first child card comprising content of a third type related to the first type and distinct from the second type.

14. The method of claim 12:
wherein rendering the first child card adjacent the video advertisement in response to selection of the parent card comprises, in response to selection of the parent card:
rendering the first child card below the video advertisement coincident a center axis defined by the video advertisement; and
rendering a first portion of a second child card in a first location adjacent the first child card and offset the center axis; and
further comprising, in response to receiving a swipe input at the first child card, rendering the second child card:
rendering the second child card below the video advertisement coincident the center axis, defined by the video advertisement, in replacement of the first child card; and
rendering a second portion of the first child card in a second location adjacent the second child card and offset the center axis, the second location opposite the first location.

15. The method of claim 12, further comprising, characterizing an engagement level of the user based on a quantity of frames of the video advertisement rendered within the display during playback of the video advertisement.

16. The method of claim 12, wherein continuing playback of the video advertisement within the expanded window and rendering the first child card adjacent the video advertisement within the expanded window in response to selection of the parent card during playback of the video advertisement comprises, in response to selection of the parent card during rendering of a second frame, succeeding the first frame, of the video advertisement:
- continuing playback of the video advertisement forward from the second frame within the expanded window; and
- rendering the first child card adjacent the video advertisement within the expanded window.

17. The method of claim 12:
- wherein inserting the parent card, comprising the video advertisement, into the visual element comprises inserting the parent card, comprising the video advertisement, into the visual element defining a first height and a first width;
- wherein triggering the computing device to open the expanded window over the electronic document comprises triggering the computing device to open the expanded window over the electronic document, the expanded window defining:
  - a second height greater than the first height; and
  - a second width greater than the first width; and
- wherein rendering the first child card adjacent the video advertisement within the expanded window comprises rendering the first child card below the video advertisement, within the expanded window, in a column spanning the second height and the second width of the expanded window.

18. The method of claim 12,
- wherein triggering playback of the video advertisement within the visual element in response to the visual element entering the viewport comprises triggering playback of the video advertisement from a first frame of the video advertisement; and
- further comprising, during playback of the video advertisement, in response to rendering a final frame, succeeding the first frame, of the video advertisement, replaying the video advertisement from the first frame.

19. A method for serving interactive content to a user comprising:
- loading an interactive advertisement into a visual element inserted within an electronic document rendered by a computing device accessed by the user, the interactive advertisement comprising:
  - a parent card comprising a video advertisement; and
  - a set of child cards, each child card, in the set of child cards, comprising:
    - advertising content associated with the video advertisement; and
    - a link to an external electronic document associated with advertising content presented within the child card;
- in response to the visual element entering a viewport of the computing device:
  - rendering the parent card within the visual element; and
  - triggering playback of the video advertisement, within the visual element, from a first frame, in a sequence of frames, of the video advertisement; and
- during playback of the video advertisement:
  - in response to selection of the parent card during playback of a second frame, succeeding the first frame, in the sequence of frames:
    - rendering a first child card, in the set of child cards, adjacent the second frame of the video advertisement; and
    - continuing playback of the video advertisement forward from the second frame; and
  - in response to a first user input at the first child card during playback of a third frame, in the sequence of frames, of the video advertisement:
    - rendering a second child card, in the set of child cards, adjacent the third frame of the video advertisement in replacement of the first child card; and
    - continuing playback of the video advertisement forward from the third frame.

20. The method of claim 19:
- wherein rendering the second child card comprises rendering the second child card comprising:
  - advertising content associated with the video advertisement; and
  - a first link to a first external electronic document associated with advertising content presented within the child card; and
- during playback of the video advertisement, in response to selection of the second child card, triggering the computing device to navigate to the first external document based on the first link.

* * * * *